(12) United States Patent
Vendrow et al.

(10) Patent No.: US 9,131,054 B2
(45) Date of Patent: *Sep. 8, 2015

(54) SYNCHRONIZATION IN UNIFIED MESSAGING SYSTEMS

(71) Applicant: RingCentral, Inc., San Mateo, CA (US)

(72) Inventors: Vlad Vendrow, Redwood Shores, CA (US); Vlad Shmunis, Hillsborough, CA (US)

(73) Assignee: RingCentral, Inc., San Mateo, CA (US)

( * ) Notice: Subject to any disclaimer, the term of this patent is extended or adjusted under 35 U.S.C. 154(b) by 49 days.

This patent is subject to a terminal disclaimer.

(21) Appl. No.: 14/073,724

(22) Filed: Nov. 6, 2013

(65) Prior Publication Data

US 2014/0057605 A1     Feb. 27, 2014

Related U.S. Application Data

(63) Continuation of application No. 12/726,332, filed on Mar. 17, 2010, now Pat. No. 8,600,363, which is a continuation of application No. 11/219,532, filed on Sep. 2, 2005, now Pat. No. 7,702,669.

(60) Provisional application No. 60/607,220, filed on Sep. 2, 2004.

(51) Int. Cl.
| | |
|---|---|
| H04W 64/00 | (2009.01) |
| H04W 4/22 | (2009.01) |
| H04M 3/533 | (2006.01) |
| H04M 1/65 | (2006.01) |
| H04M 3/53 | (2006.01) |
| H04M 1/725 | (2006.01) |

(52) U.S. Cl.
CPC .............. *H04M 3/533* (2013.01); *H04M 1/65* (2013.01); *H04M 3/5315* (2013.01); *H04M 1/72547* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,702,669 | B2 * | 4/2010 | Vendrow et al. | 707/620 |
| 8,285,267 | B2 * | 10/2012 | Vendrow et al. | 455/416 |
| 8,335,498 | B2 * | 12/2012 | Vendrow et al. | 455/416 |
| 8,600,363 | B2 * | 12/2013 | Vendrow et al. | 455/416 |

OTHER PUBLICATIONS

U.S. Appl. No. 12/726,332, filed Mar. 17, 2010, Notice of Allowance, Aug. 2, 2013.

(Continued)

*Primary Examiner* — Diane Mizrahi
(74) *Attorney, Agent, or Firm* — Finnegan, Henderson, Farabow, Garrett & Dunner LLP

(57) ABSTRACT

Techniques for synchronization of fax and/or voice messages in a client-server arrangement are disclosed. In one embodiment, for example, a synchronization method in a phone includes: initiating synchronization of a set of fax and/or voice messages on the phone with a set of fax and/or voice messages on a server; sending a request to the server to receive state of the set of messages on the server; identifying state of the set of messages on the phone; performing a discrepancy assessment between the state of the set of messages on the server and the state of the set of messages on the phone; based on results of the discrepancy assessment, creating a list of synchronization actions to perform for synchronizing the set of messages on the phone with the set of messages on the server; and performing the synchronization actions in the list.

21 Claims, 5 Drawing Sheets

(56) References Cited

OTHER PUBLICATIONS

U.S. Appl. No. 12/726,332, filed Mar. 17, 2010, Office Action, Jul. 3, 2013.

U.S. Appl. No. 95/001,844, filed Dec. 8, 2011 Notice of Appeal, Dec. 20, 2013.

U.S. Appl. No. 95/001,844, filed Dec. 8, 2011, Communication to Third Party Requester Inter Partes Reexamination, Jun. 11, 2014.

* cited by examiner

SYNCHRONIZATION IN UNIFIED MESSAGING SYSTEMS

CROSS-REFERENCE TO RELATED APPLICATIONS; BENEFIT CLAIM

This application claims the benefit as a Continuation of application Ser. No. 12/726,332 filed Mar. 17, 2010, which in turn claims the benefit as a Continuation of application Ser. No. 11/219,532 filed Sep. 2, 2005 (now U.S. Pat. No. 7,702,669), which in turn claims the benefit of Provisional Appln. Ser. No. 60/607,220 filed Sep. 2, 2004, the entire contents of each which is hereby incorporated by reference as if fully set forth herein, under 35 U.S.C. §120. The applicant(s) hereby rescind any disclaimer of claim scope in the parent application(s) or the prosecution history thereof and advise the USPTO that the claims in this application may be broader than any claim in the parent application(s).

FIELD OF THE INVENTION

The present application relates generally to messaging systems.

BACKGROUND

A messaging system can be used to convey information from a sender to a recipient. Conventional messaging systems use various input and delivery mechanisms including telephones, pagers, computers, recorders, answering machines and other systems to formulate and deliver the message content.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

According to one aspect, a unified messaging system includes a server configured to store a plurality of server messages, a client configured to store a plurality of client messages and a synchronization application which synchronizes the client messages with the server messages associated with the client. The server messages includes voicemail messages and fax messages for a client, and the client messages includes voicemail messages and fax messages for the client and correspond generally to the server messages.

In some implementations, one or more of the following features may be present. The server messages include received messages and sent messages, and the client messages include received messages and sent messages. Each of the server messages includes a server message index and a read/unread status, each of the client messages includes a client message index and a read/unread status, and synchronizing the client messages with the server messages includes synchronizing server message indices with client message indices, and server message read/unread statuses with client message read/unread statuses.

In another implementation, the synchronization application determines whether a server message on the server has previously been synchronized to establish a corresponding client message on the client.

According to another aspect, a synchronization method includes storing a plurality of server messages containing voicemail messages and fax messages on a server, storing a plurality of client messages containing voicemail messages and fax messages corresponding generally to the server messages on a client, and synchronizing the client messages with the server messages.

In a related aspect, a synchronization method includes storing a plurality of server messages containing voicemail messages and fax messages on a server, storing a plurality of client messages containing voicemail messages and fax messages corresponding generally to the server messages on a client, and generating an identifier on the client and the server at each synchronization.

In various implementations, one or more of the following advantages may be present. Based on the results of the discrepancy assessment established during the synchronization, the synchronization application creates a list of synchronization actions that can be performed in order to synchronize the messages on the server with the messages on the client without having a need to maintain a history of all prior messages on the client. The state of messages on the client may also be updated so that requests may be sent to the server to update the state of messages on the server.

Other features and advantages will be readily apparent from the following detailed description, the accompanying drawings and the claims.

BRIEF DESCRIPTION OF THE DRAWINGS

In the drawings in which like reference numbers and designations in the various figures indicate like elements.

DETAILED DESCRIPTION

Figure 1:
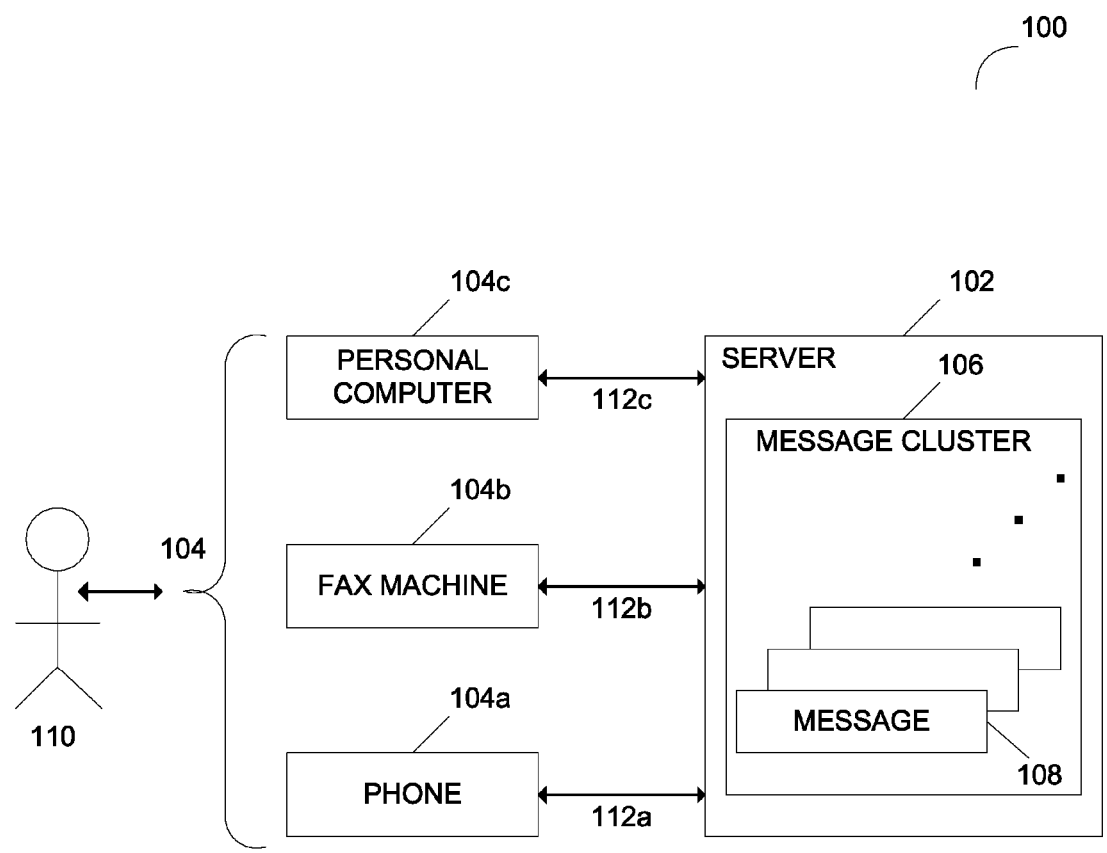
FIG. 1 is a block diagram of a unified messaging system according to one implementation.

As shown in FIG. 1, a unified messaging system 100 integrates several different communications media to allow a user 110 to send and retrieve voice 112a, fax 112b, and messages 112c (e.g., e-mail, text, etc.) from a single interface, whether it be a phone 104a, a fax machine 104b, or a personal computer 104c.

A unified messaging system 100 includes a server 102 that can store messages 108 of different types and of different communications media (e.g., received messages, sent messages, voicemail messages, fax messages, etc.). Messages 108 are grouped into message clusters 106, or mailboxes, that are associated with individual users 110, or groups of users. In one implementation, each individual message 108 includes, but is not limited to, a unique message index (e.g. identifiers), message content (e.g., voice, video, data), message properties (e.g., date and time, sender information), and message status (e.g., read, unread). A particular combination of message indexes and message statuses of all messages 108 in a given message cluster 106 is referred to as the state of the messages in the given cluster 106.

The unified message system 100 further includes one or more clients 104 for a given user 110. A client 104 can store local copies of the messages 108 that are stored on the server 102. A client 104 can include a synchronization application (discussed in greater detail below) that periodically synchronizes the client 104 with the server 102 to ensure that the state of messages on the server 102 is the same as the state of messages on the client 104. Discrepancies between the state of messages on the server 102 and the state of messages on the client 104 arise as a result of the user 110 deleting a message (e.g., on the server 102 and not deleting the message on the client 104, and vice versa), messages arriving at the server 102 and not being loaded on the client 104, the user 110 viewing a message on a client device or at the server 102, and so on. In one implementation, the synchronization application is not an e-mail application.

Figure 2A:
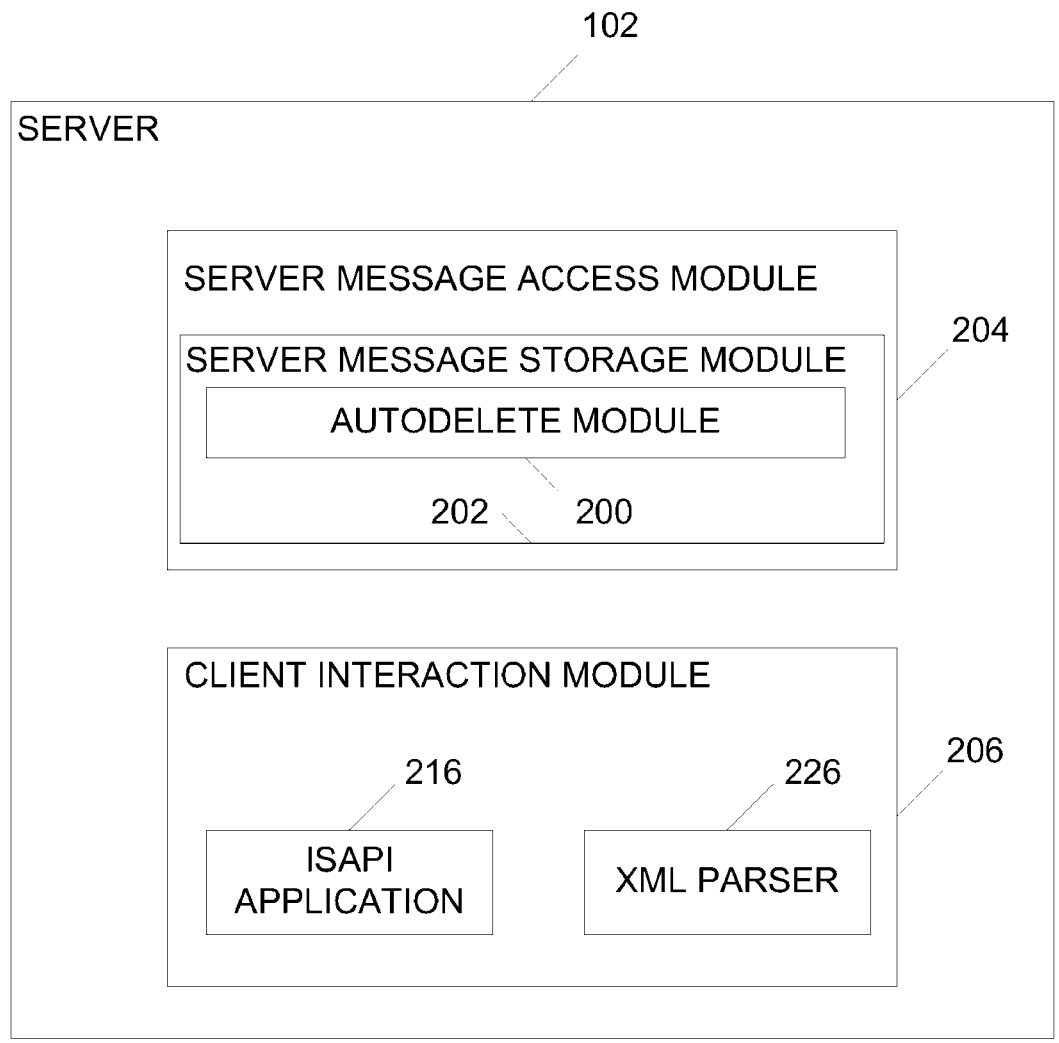
FIG. 2A is a block diagram of a server.

FIG. 2A illustrates components of a server 102 according to one implementation. The server 102 includes a server message storage module 202, which manages the storage of messages on the server 102. The server message storage module 202 can be an actual location where the messages are stored. Alternatively, the server message storage module 202 can contain information as to where and how the messages are stored on the server 102 or an external server.

The server 102 further includes an autodelete module 200, which automatically deletes certain messages 108 from the server 102 at predetermined intervals. For instance, the server 102 can be configured such that a given message 108 that arrives at the server 102 is automatically deleted from the server ten days after arriving. The autodelete module 202 can be a part of the server message storage module 202.

The server 102 further includes a server message access module 204, which is an interface to the server message storage module 202. The content and the properties of a given message in the server message storage module 202 are accessed and manipulated through the server message access module 204. The server message storage module 202 can be a part of the server message access module 204.

The server 102 further includes a client interaction module 206 through which the server 102 interacts with a client 104. In particular, the server 102 uses the client interaction module 206 to receive and process requests from a client 104. In one implementation, the client interaction module 206 includes an Internet Server Application Program Interface (ISAPI) application 216 for receiving the requests and an XML parser 226 for processing the requests. The client interaction module 206 can also include a telephone access interface (not shown), e.g., HTTP stream interface, and a web access (not shown), e.g., IVR interface.

Figure 2B:
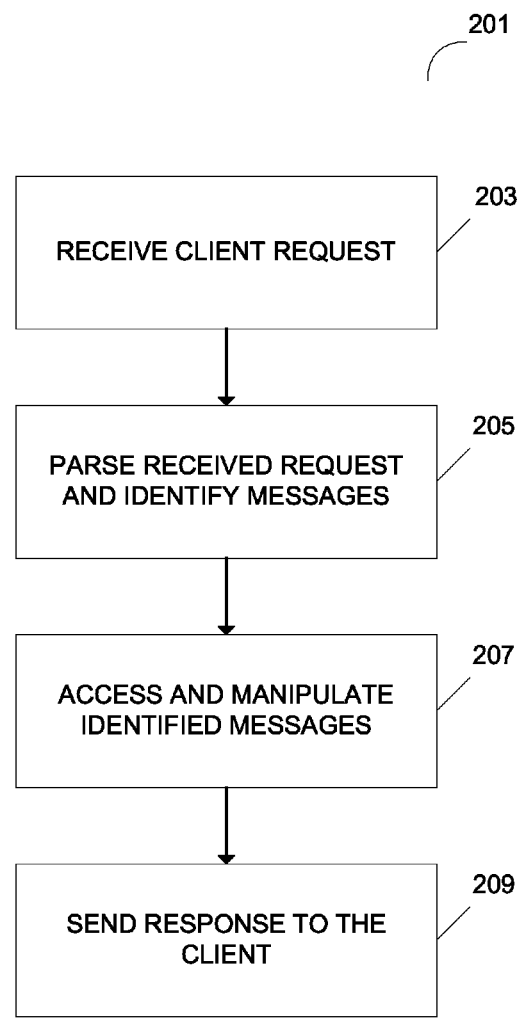
FIG. 2B is a flowchart illustrating a sequence of steps for processing a client request on a server.

Accordingly, as shown in a flow chart in FIG. 2B, the steps 201 for processing a request from a client 104 on the server 102 include receiving the request through, for example, the ISAPI application 216 (step 203). Processing the client's request further includes parsing the request using, for example, the XML parser 226 (step 205), which identifies the messages in the server message storage module 202 that need to be accessed. Processing the client's request further includes accessing the identified messages through the server message access module 204 and manipulating the identified messages in the server message storage module 202 per the client's request (207). Optimally, processing the client's request further can include sending a response to the client 104 (step 209). For instance, the response can include information requested by the client 104 and/or information as to whether the request was processed successfully or if there were errors.

Figure 3A:
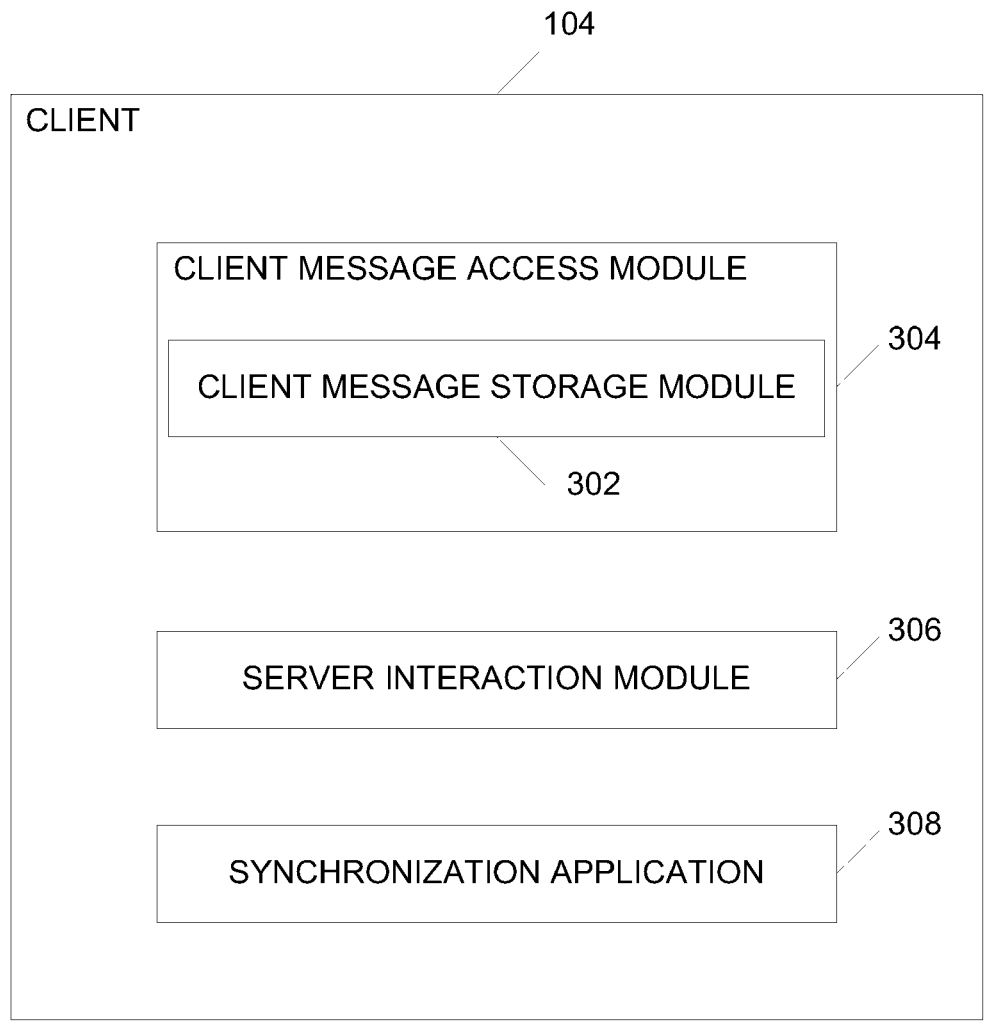
FIG. 3A is a block diagram of a client.

FIG. 3A illustrates components of a client 104 according to one implementation. The client 104 includes a client message storage module 302, which manages the storage of messages on the client 104. The client message storage module 302 can be an actual location where the messages are stored. Alternatively, the client message storage module 302 can contain information as to where and how the messages are stored on the client 104 or an external device.

The client 104 further includes a client message access module 304, which is an interface to the client message storage module 302. The content and the properties of a given message in the client message storage module 302 are accessed and manipulated through the client message access module 304. The client message storage module 302 can be part of the client message access module 304.

The client 104 further includes a server interaction module 306 through which the client 104 interacts with the server 102. In particular, the client 104 sends requests to the server 102 and receives the server's responses through the server interaction module 306. To send a request to the server 102, the client 104 first uses the server interaction module 306 to connect to the server 102 by establishing, for example, an HTTP connection. Subsequently, the server interaction module 306 exchanges data with the server 102 specific to the request using, for example, an XML parser.

The client 104 further includes a synchronization application 308, which is responsible for synchronizing the messages on the server 102 with the messages on the client 104. In particular, the synchronization application 104 receives the state of messages in the server message storage module 202 on the server 102 and compares it with the state of the messages in the client message storage module 302 on the client 104. The synchronization application 308 further identifies a set of actions that need to be performed to synchronize the messages on the server 102 with the messages on the client 104 and subsequently performs those actions.

Figure 3B:
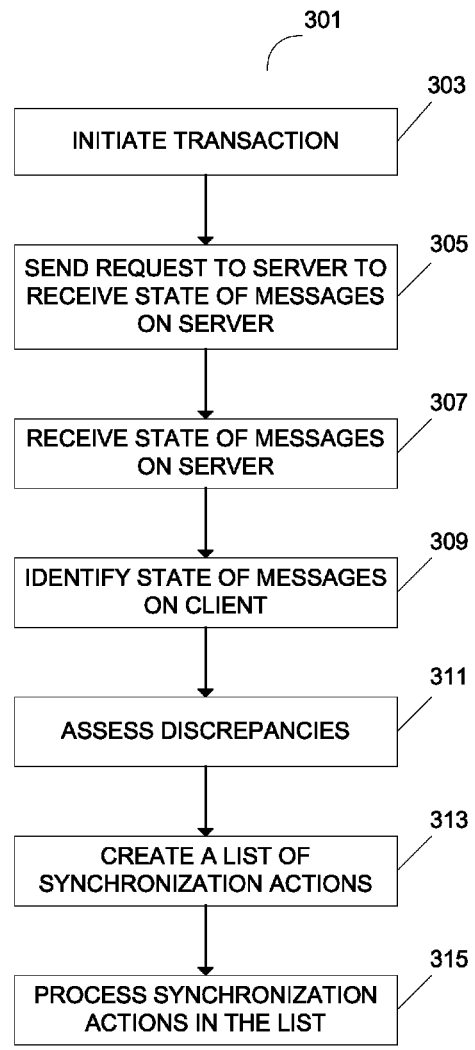
FIG. 3B is a flowchart illustrating a client-based synchronization process.

A process 301 that the synchronization application 308 uses to synchronize the messages on the server 102 with the messages on the client 104, according to one implementation, is outlined in more detail in FIG. 3B. Referring now to FIGS. 1 and 3B, the synchronization application 308 on the client 104 initiates synchronization (step 303) by establishing, for example, an HTTP connection with the server 102. A variety of conditions can cause the synchronization application 308 on the client 104 to initiate synchronization. For instance, the synchronization application 308 on the client 104 can initiate synchronization when it receives a new message notification from the server 102. The synchronization application 308 on the client 104 can also initiate synchronization when a message on the client 104 is deleted.

In one implementation, a unique ID is generated at each synchronization and saved on both the client 104 and the server 102. Prior to initiating the next synchronization, the client 104 transfers this unique ID to the server 102. The synchronization application 308 on the client 104 can proceed to synchronize the message on the client 104 and the server 102 after the server 102 compares and determines that the unique ID received from the client 104 and that saved on the server 102 corresponds. If the unique ID received from the client 104 and that is saved on the server 102 do not correspond, synchronization application 308 does not initiate a synchronization so as to avoid any unnecessary synchronization.

Other conditions that cause the synchronization application 308 on the client 104 to initiate synchronization can include, but are not limited to, the user 110 requesting synchronization, the client 104 connecting to the server 102, the state of the client 104 changing from offline to online, or a message on the client 104 changing status, a timer associated. Also, synchronization can be performed at predetermined intervals and initiated, for instance, by a synchronization timer.

Once synchronization is initiated (step 303), the synchronization application 308 on the client 104 sends a request to the server 102 through the server interaction module 306 to receive the state of the messages stored on the server 102 (step 305). The server 102 processes the request according to the steps outlined in reference to FIG. 2B and can send a response containing information about the state of the messages stored on the server 102 to the client 104.

Once the client 104 receives the state of the messages stored on the server 102 (step 307), the synchronization application 308 identifies the state of the messages stored on the client 104 (step 309) using the client message access module 304.

Subsequently, the client's synchronization application 308 assesses the discrepancies between the state of messages stored on the server 102 and the state of messages stored on the client 104 (step 311). In one implementation the discrepancy assessment involves comparing the indexes of the messages stored on the server 102 with the indexes of the messages stored on the client 104. For example, if the indexes of the messages on the server 102 are 1001, 1002, 1003 and 1004, and the indexes of the messages on the client 104 are 1001, 1002, and 1004, the message with index 1003 has been deleted from the client 104 but not from the server 102. The discrepancy assessment can further include comparing the statuses of the messages with the same indexes on the client 104 and on the server 102.

Based on the results of the discrepancy assessment (step 311) the synchronization application 308 creates a list of synchronization actions that need to be performed in order to synchronize the messages on the server 102 with the messages on the client 104 (step 313). The synchronization actions can include, but are not limited to, deleting messages on the client 104, changing the status of a given message of the client 104, sending a request to the server 102 to delete messages on the server 102, sending a request to the server 102 to change the status of a given message on the server 102. In one implementation, a list of synchronization actions is created based on the following rules:

1) If a new message has been added on the server 102 since the last synchronization (e.g., a new message has been received), the message is added on the client 104.

2) If a new message has been added on the client 104 since the last synchronization (e.g., a new message has been sent), the message is added on the server 102.

3) If a message on the server 102 has been marked as "read" since the last synchronization, the corresponding message on the client 104 is also marked as "read".

4) If a message on the client 104 has been marked as "read" since the last synchronization, the corresponding message on the server 102 is also marked as "read".

5) If a message on the server 102 has been marked as "unread" since the last synchronization, the corresponding message on the client 104 is also marked as "unread".

6) If a message on the client 104 has been marked as "unread" since the last synchronization, the corresponding message on the server 102 is also marked as "unread".

7) If a message on the server 102 has been deleted since the last synchronization, and the deletion was not performed by the autodelete module 200, the corresponding message on the client 104 is also deleted.

8) If a message on the client 104 has been deleted since the last synchronization, the corresponding message on the server 102 is also deleted.

Once the list of synchronization actions is created, the synchronization application 308 performs the synchronization actions in the list (step 315). Performing synchronization actions in the list can include, but is not limited to, updating the state of messages on the client 104 and sending requests to the server 102 to update the state of messages on the server 102.

The invention and all of the functional operations described in this specification can be implemented in digital electronic circuitry, or in computer software, firmware, or hardware, including the structural means disclosed in this specification and structural equivalents thereof, or in combinations of them. The invention can be implemented as one or more computer program products, i.e., one or more computer programs tangibly embodied in an information carrier, e.g., in one or more non-transitory computer-readable media, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The processes and logic flows described in this specification, including the method steps of the invention, can be performed by one or more programmable processors executing one or more computer programs to perform functions of the invention by operating on input data and generating output. The processes and logic flows can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component (e.g., a data server), a middleware component (e.g., an application server), or a front-end component (e.g., a client computer having a graphical user interface or a Web browser through which a user can interact with an implementation of the invention), or any combination of such back-end, middleware, and front-end components. The components of the system can be interconnected by any form or medium of digital data communication, e.g., a communication network. Examples of communication networks include a local area network ("LAN"), e.g., a wireless LAN, and a wide area network ("WAN"), e.g., the Internet.

The invention has been described in terms of particular embodiments, but other embodiments can be implemented and are within the scope of the following claims. For example, the operations of the invention can be performed in a different order and still achieve desirable results. As one example, the process depicted in FIG. 3B does not require the particular order shown, or sequential order, to achieve desirable results (e.g., step 305 can follow steps 307 and 309). Furthermore, synchronization application 308 can run on the client 104, or on the server 102. Moreover, a portion of the synchronization application 308 can run on the client 104, and a portion of the synchronization application 308 can run on the server 102. In certain implementations, multitasking and parallel processing may be preferable.

What is claimed is:

1. A synchronization method in a phone, the phone comprising one or more processors for executing instructions implementing the method and one or more memory devices for storing the instructions and associated data, the method comprising:
    initiating synchronization of a set of fax and/or voice messages on the phone with a set of fax and/or voice messages on a server;
    sending a request to the server to receive state of the set of messages on the server;
    identifying state of the set of messages on the phone;
    performing a discrepancy assessment between the state of the set of messages on the server and the state of the set of messages on the phone;
    based on results of the discrepancy assessment, creating a list of synchronization actions to perform for synchronizing the set of messages on the phone with the set of messages on the server; and
    performing the synchronization actions in the list.

2. The method of claim 1, wherein the step of initiating synchronization comprises establishing a Hyper Text Transfer Protocol (HTTP)-based connection with the server.

3. The method of claim 1, further comprising receiving a new message notification from the server; wherein the step of initiating synchronization is performed in response to receiving the new message notification.

4. The method of claim 1, further comprising deleting a message on the phone; wherein the step of initiating synchronization is performed in response to deleting the message.

5. The method of claim 1, further comprising detecting a request from a user to initiate synchronization; wherein the step of initiating synchronization is performed in response to detecting the user request.

6. The method of claim 1, further comprising connecting to the server; wherein the step of initiating synchronization is performed in response to connecting to server.

7. The method of claim 1, further comprising detecting a state change of the phone from offline to online; wherein the step of initiating synchronization is performed in response to detecting the state change.

8. The method of claim 1, further comprising detecting a status change of a message on the phone; wherein the step of initiating synchronization is performed in response to detecting the status change.

9. The method of claim 1, further comprising detecting expiration of a timer; wherein the step of initiating synchronization is performed in response to detecting expiration of the timer.

10. The method of claim 1, wherein performing the discrepancy assessment comprises comparing indices for the set of messages on the phone with indices for the set of messages on the server.

11. The method of claim 1, wherein performing the discrepancy assessment comprises comparing statuses for the set of messages on the phone with statuses for the set of messages on the server.

12. The method of claim 1, wherein performing the synchronization actions in the list comprises sending at least one request to the server to update the state of the set of messages on the server.

13. The method of claim 1, wherein the state of the set of messages on the phone comprises, for each phone message in the set of messages on the phone, information that indicates whether the phone message is read or unread since a last synchronization with the server; wherein the state of the set of messages on the server comprises, for each server message in the set of messages on the server, information that indicates whether the server message is read or unread since a last synchronization with the phone.

14. A phone comprising:
    one or more processors;
    memory storing instructions which, when executed by the one or more processors, causes performance of a method comprising:
        initiating synchronization of a set of fax and/or voice messages on the phone with a set of fax and/or voice messages on a server;
        sending a request to the server to receive state of the set of messages on the server;
        identifying state of the set of messages on the phone;
        performing a discrepancy assessment between the state of the set of messages on the server and the state of the set of messages on the phone;
        based on results of the discrepancy assessment, creating a list of synchronization actions to perform for synchronizing the set of messages on the phone with the set of messages on the server; and
        performing the synchronization actions in the list.

15. The phone of claim 14, wherein the step of initiating synchronization comprises establishing a Hyper Text Transfer Protocol (HTTP)-based connection with the server.

16. The phone of claim 14, the method further comprising receiving a new message notification from the server; wherein the step of initiating synchronization is performed in response to receiving the new message notification.

17. The phone of claim 14, wherein performing the discrepancy assessment comprises comparing indices for the set of messages on the phone with indices for the set of messages on the server.

18. The phone of claim 14, wherein performing the discrepancy assessment comprises comparing statuses for the set of messages on the phone with statuses for the set of messages on the server.

19. The phone of claim 14, the method performing the synchronization actions in the list comprises sending at least one request to the server to update the state of the set of messages on the server.

20. The phone of claim 14, wherein the state of the set of messages on the phone comprises, for each phone message in the set of messages on the phone, information that indicates whether the phone message is read or unread since a last synchronization with the server; wherein the state of the set of messages on the server comprises, for each server message in the set of messages on the server, information that indicates whether the server message is read or unread since a last synchronization with the phone.

21. A server comprising:
   one or more processors;
      memory storing instructions which, when executed by the one or more processors, cause performance of a method comprising:
         receiving a first request from a phone of a user to receive state of a set of voice and/or fax messages associated with an identifier of the user on the server;
         in response to receiving the first request, sending state of the set of messages associated with the identifier of the user on the server to the user's phone;
         receiving a second request from a computing device of the user to receive state of the state of voice and/or fax messages associated with the identifier of the user on the server;
         in response to receiving the second request, sending state of the set of messages associated with the identifier of the user on the server to the user's computing device;
         after receiving the first request, receiving first state information from the user's phone for updating state of the set of messages associated with the identifier of the user on the server;
         in response to receiving the first state information, updating state of the set of messages associated with the identifier of the user on the server based on the first state information;
         after receiving the second request, receiving second state information from the user's computing device for updating state of the set of messages associated with the identifier of the user on the server;
         in response to receiving the second state information, updating state of the set of messages associated with the identifier of the user on the server based on the second state information.

* * * * *